Nov. 15, 1955 V. SALOMÉ ET AL 2,723,582
HYDRAULICALLY CONTROLLED CARRIAGE RETURNING MECHANISM
Filed March 26, 1952 4 Sheets-Sheet 1

INVENTORS:
VICTOR SALOMÉ
CLOTAIRE SALOMÉ

Nov. 15, 1955    V. SALOMÉ ET AL    2,723,582
HYDRAULICALLY CONTROLLED CARRIAGE RETURNING MECHANISM
Filed March 26, 1952    4 Sheets-Sheet 2
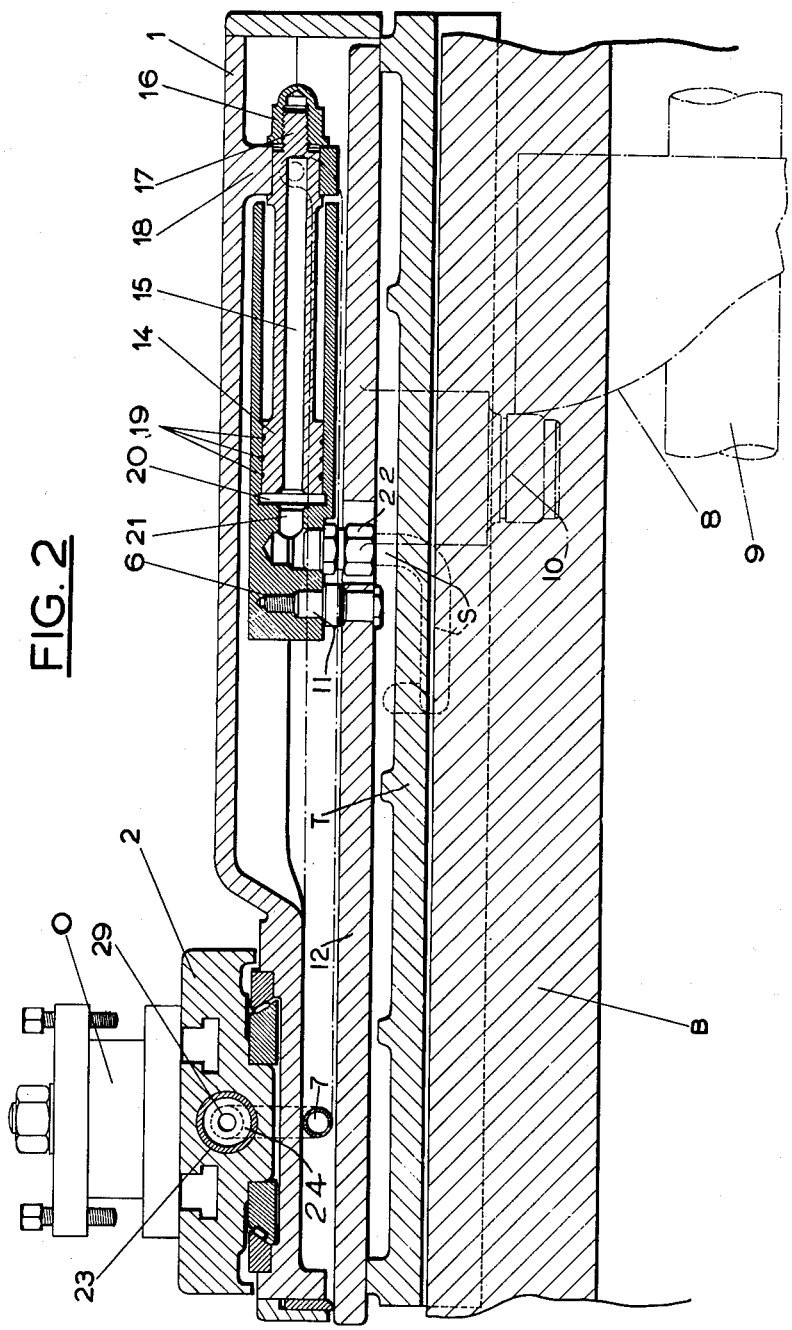
INVENTORS:
VICTOR SALOMÉ
CLOTAIRE SALOMÉ

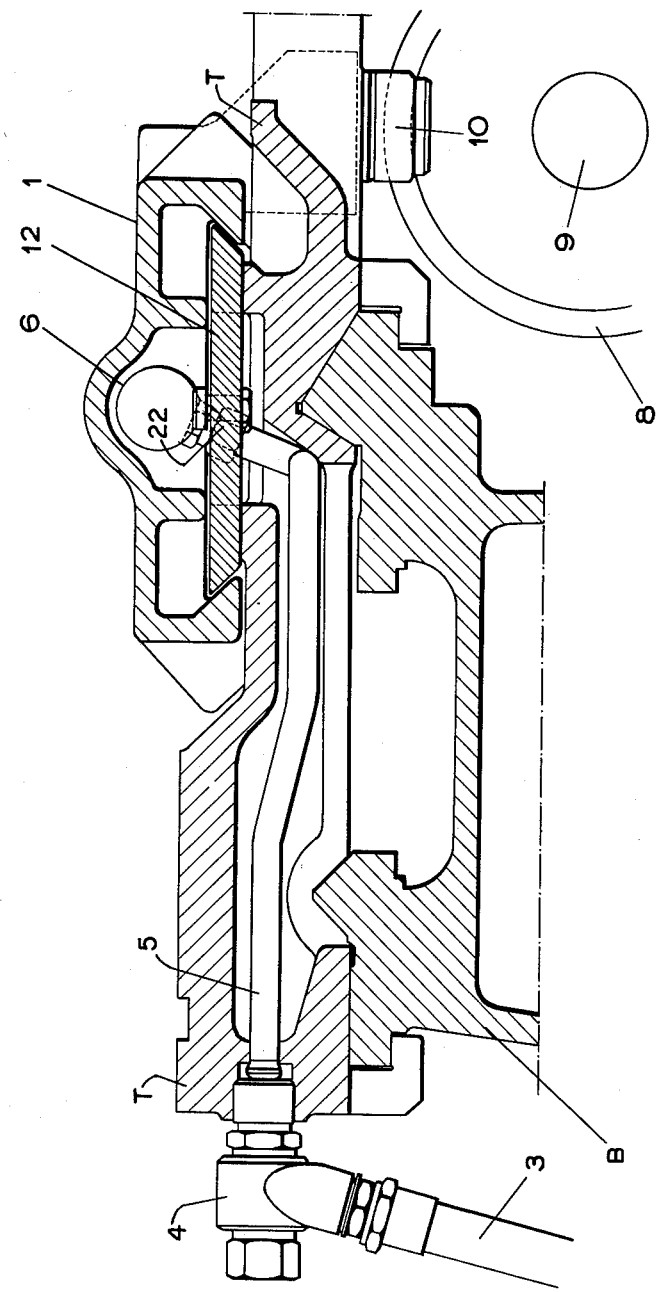

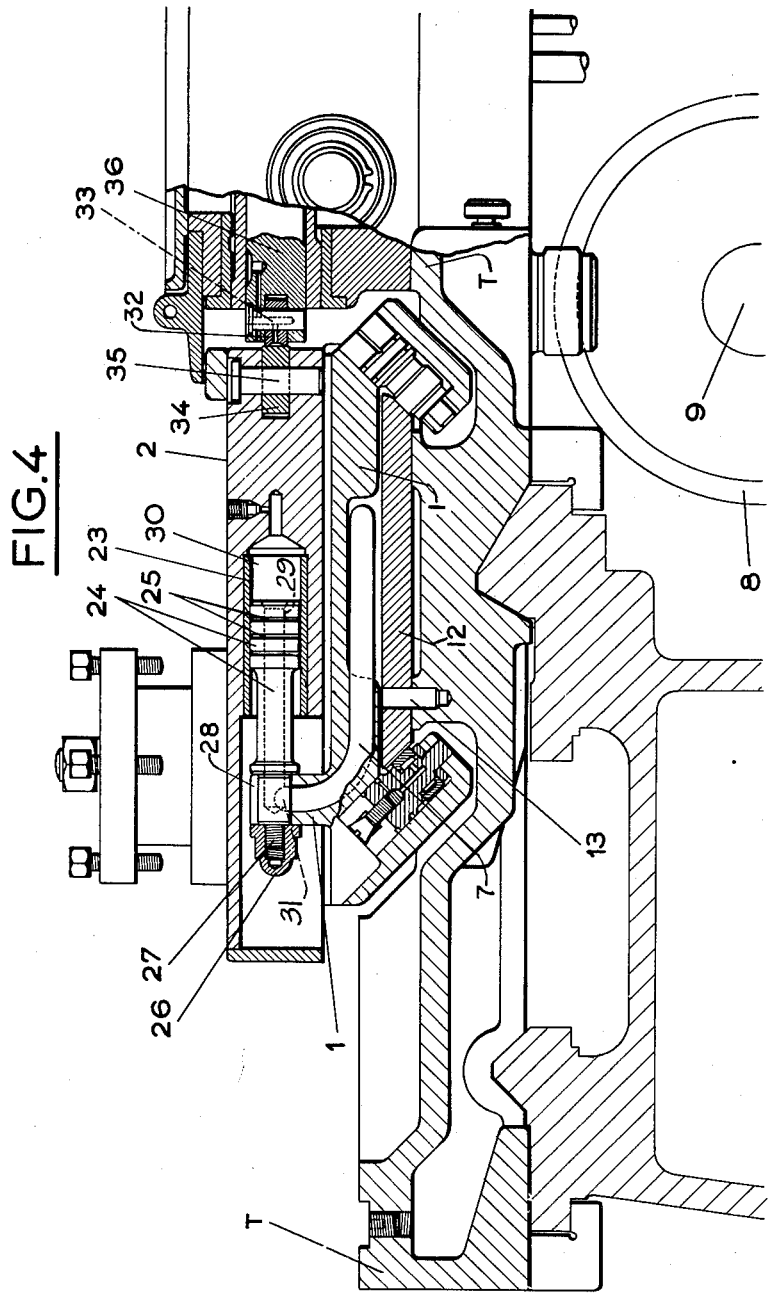

United States Patent Office 2,723,582
Patented Nov. 15, 1955

2,723,582

HYDRAULICALLY CONTROLLED CARRIAGE RETURNING MECHANISM

Victor Salomé and Clotaire Salomé, Le Pecq, France

Application March 26, 1952, Serial No. 278,642

Claims priority, application France March 29, 1951

2 Claims. (Cl. 82—21)

The present invention refers to a hydraulically controlled carriage returning mechanism and has as one of its objects to provide means facilitating the accuracy of machining executed by tool machines in which a tool is mounted on a support, the movement of which is controlled by the automatic associated movements of two or more carriages assuming reciprocating rectilinear relative movements under the action of a suitable mechanism.

Whatever may be the type of mechanism resorted to for producing this reciprocating rectilinear movement of a main carriage with reference to the frame of the machine or of an auxiliary carriage with reference to the carriage on which it is mounted, this mechanism exerts on the carriages during the operative stroke of the tool a variable stress that acts detrimentally on the accuracy of operation of said tool.

This is the case in particular in semi-automatic threading machines constituted substantially by a lathe provided with a main and normally stationary carriage on which a second carriage moves longitudinally, while a third carriage moving transversely over the second carriage serves as the support for the actual tool carrier.

In a machine of this type, the longitudinal shifting of the second carriage is obtained by means of a rotary cam against which the longitudinally moving carriage bears through the agency of a follower or roller, the continuous pressure at the contact point between the cam and the roller being obtained by return springs the ends of which engage, respectively, the main carriage and the longitudinally movable carriage; the shifting of the transversely moving carriage is similarly obtained by means of a mechanism including a rotary cam which in its turn and through the agency of a leverage shifts a thrust member acting in a transverse direction on the carriage on which the tool carrier is mounted with a view to moving the tool nearer the axis of the work to be threaded while said transversely moving carriage is held against the thrust member under the action of the return springs, the ends of which are engaged, respectively, on the longitudinally moving carriage and on the transversely moving carriage. The result of this arrangement is that the reaction of any carriage with reference to the member producing its shifting should balance the tractional action of the return springs acting on this carriage; now this tractional action varies with the elongation of the spring; this modification in the reaction of the carriage exerted against the mechanism controlling its movements leads to a modification in the elastic deformation to which said mechanism is inevitably submitted, such a modification being objectionable for any machining requiring a high accuracy. Furthermore, it should be remarked that an arrangement involving return of the carriages into their respective starting positions by means of springs readily allows the transmission of vibrations which are also objectionable for highly accurate machining.

The present invention eliminates the aforedescribed disadvantages and has as its main object the provision of a hydraulically-operated return system for the mechanism producing the translational movement of a machine tool carriage or the like and, according to a further feature of the invention, the carriage and the support thereof form members one of which is fixedly associated with a piston and the other of which is fixedly associated with a cylinder retaining the piston in a fluid-tight manner, the common axis of said cylinder and piston being parallel to the direction of the movement to be transmitted to the carriage, while a pipe connects the cylinder chamber with a source of fluid compressed under an adjustable pressure, whereby the fluid pressure urges said carriage against the operative part of the mechanism producing its translational movement during the operation of the machine tool or the like.

One of many possible embodiments of a mechanism according to this invention, is shown merely by way of illustration. In the accompanying drawings illustrating the preferred embodiment of the invention:

Fig. 2 is a vertical longitudinal cross-section drawn on a larger scale of the longitudinally moving carriage of the threading machine illustrated in Fig. 1.

Fig. 3 is a cross-section taken at right angles with respect to the preceding cross-section of the same longitudinally moving carriage.

Fig. 4 is a vertical cross-section of the longitudinally and transversely moving carriages, said cross-section passing through the axis of the hydraulically operated device returning the latter carriage towards its starting position.

Figure 1:
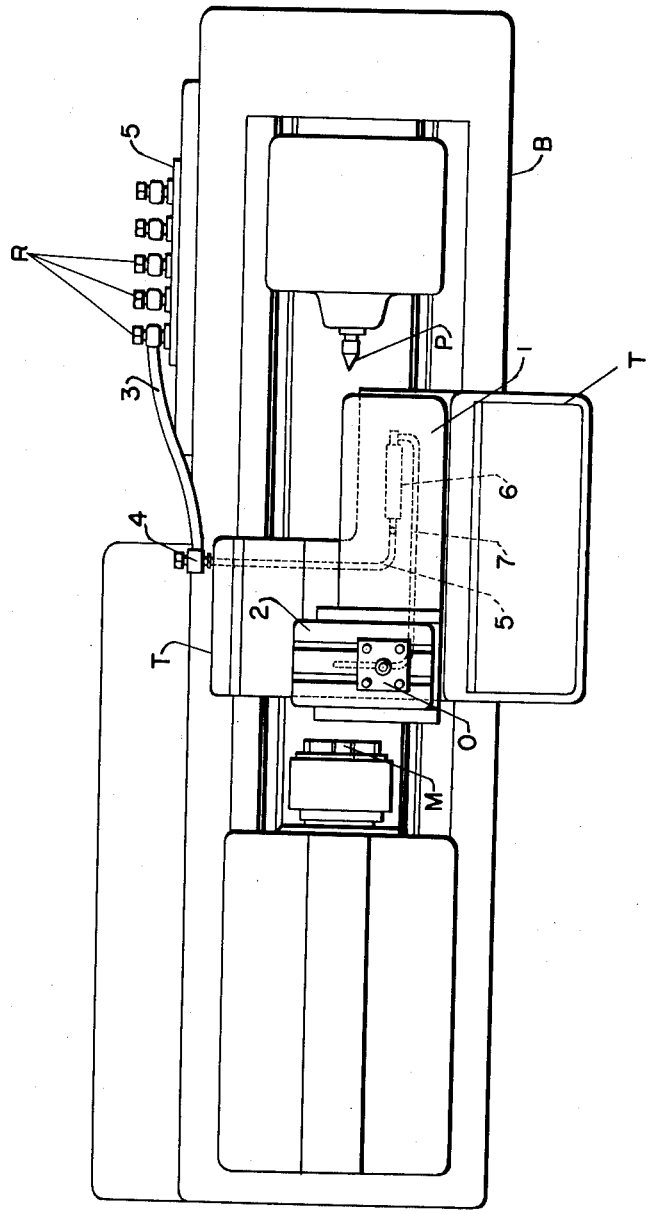
Fig. 1 is a general top plan view of a semi-automatic threading machine incorporating a mechanism made according to my invention.

The threading machine according to Fig. 1 takes the form of a lathe on the frame B of which may be slidably mounted a main carriage T which is normally held stationary in a predetermined position for the machining of a series of identical work pieces.

On the main carriage T is mounted a carriage 1 adapted to slide in parallelism with the axis of rotation of the spindle M and of the movable head-stock P of the machine tool.

Said longitudinally moving carriage 1 carries in its turn a transversely moving carriage 2 adapted to slide transversely over the carriage 1 perpendicularly to the axis of rotation of the spindle M. To this carriage 2 the tool-carrier O is secured.

S designates a supply of hydraulic fluid, preferably oil under pressure; tappings R are provided on this supply for feeding various circuits conveying fluid under pressure to the hydraulically controlled means adapted to actuate the machine-tool. A flexible conduit or pipe 3 connects one of these tappings R with a connection 4 carried by the main carriage T and opening into a pipe 5 rigid with said main carriage, said pipe 5 providing for connection with a cylinder 6 also rigid with the main carriage T. A pipe 7 fixedly secured to longitudinally moving carriage 1 connects in turn cylinder 6 with means including cylinder 23 (see Fig. 4) for urging the transversely moving carriage 2 back into its starting position, as will be more fully described hereinafter.

The shifting of the carriage 1 is produced as illustrated in Figs. 2 and 3 through the rotation of a cam 8 rigid with a shaft 9 revolving in synchronism with the spindle M through the agency of any transmission means of which certain parts are selected in accordance with the pitch of the thread to be executed. The cam 8 engages a follower or roller 10 rotatably mounted without clearance on a spindle rigid with the carriage 1. The cylinder 6 is rigid with main carriage T through the agency of a retaining stud 11, the upper end of which is threaded and screwed inside said cylinder 6, said threaded stud being held at its lower end in a plate 12 carrying the lateral slideways in which the carriage 1 is guided. Said plate 12 is rigidly secured to the main carriage T by means of pins 13.

A piston 14 provided with an axial bore 15 is secured to the carriage 1 through the agency of a tapped cap 16 screwed over the outer threaded end 17 of the piston, which end extends through an opening provided for this purpose in a transverse stay or web 18 rigid with the carriage 1; packing rings 19 provide fluid-tight connection between the walls of the cylinder chamber 20 and the head of the piston 14. The chamber 20 communicates through a port 21 formed in the body of the cylinder with a connection 22 into which the pipe 5 opens, which pipe 5 is fed with the operative fluid.

As apparent from an inspection of Fig. 2, the pressure of oil or any other suitable hydraulic medium entering the chamber 20 urges the piston 14 towards the right hand side of said figure and consequently the carriage 1 and the follower or roller 10 thereon are also urged in the same direction.

This insures consequently a continuous engagement between the roller 10 and the cam 8 under constant pressure conditions, said pressure being adjusted through any known means incorporated in the supply S of compressed fluid.

The mechanism returning the transversely moving carriage 2 (Fig. 4) into its starting position includes a cylinder 23 housed inside the body of this carriage and a piston 24 slidably arranged within the cylinder 23 and provided with packing rings 25. The piston 24 is secured to the carriage 1 and to the end of the pipe 7 forming part of said carriage 1 through the agency of a tapped cap 26 screwed over the threaded end 27 of the piston 24. Said threaded end 27 extends through the cylindrical chamber provided at the end of the pipe 7 inside a shell 28 that houses thus the end of the piston rod 24. Said piston is provided with an axial bore 29 opening into the chamber 30 of the cylinder 23 and connected through a radial port 31 with the pipe 7. The compressed fluid enters therefore the line 7—31—29 and thence the fluidtight cylinder chamber 30.

The transverse shifting of the carriage 2 is obtained by the thrust of the shoe 32 pivotally carried by a spindle 33 and engaging a suitably outlined cam shaped wedge 34 the slope of which varies when it pivots round pin 35 rigid with the carriage 2, the slope with reference to the axis of the thread to be executed allowing the machining of conical threads. The spindle 33 is rigid with a member 36 adapted to slide in the direction of the movement of the transverse carriage under the action of a mechanism of any known type mounted on the main carriage T and to which movement is transmitted through the agency of a pinion slidingly carried by a fluted shaft revolving in synchronism with the main control spindle of the machine-tool as well known per se.

As apparent from inspection of Fig. 4 the oil under pressure admitted into the chamber 30 from the chamber 20 of the first cylinder 6 through the bore 15 in the piston 14 and the pipe 7, urges the carriage 2 against the shoe 32 by urging the cam or wedge member 34 under constant pressure conditions against said shoe 32, whereby the different members of the movement transmitting mechanisms are submitted to a predetermined stress when the pressure of oil assumes a constant value.

Obviously the arrangement described limits by no means the possible embodiments of our invention and it is possible without unduly widening the scope of the latter to resort to any suitable compressed fluid, while the hydraulic carriage returning mechanism described may be used in association with any driving mechanism of a known type: thus the hydraulic carriage returning mechanism may be applied to advantage to a mechanism providing the positive drive of a carriage in both directions of its rectilinear reciprocating movement.

It is also possible to execute pipes for compressed fluid rigid with the carriages or the movable supports thereof through any known means or methods and for instance said pipes may be formed or enclosed inside the cast member to which they are to be associated or else they may be secured to the corresponding carriage or support in a removable manner through any suitable means.

It can thus be seen that there has been provided in accordance with the invention a machine tool having a carriage element, a supporting element therefor on which said carriage element is arranged to perform reciprocal movement, and actuating means for effectuating movement of said carriage element at least during movement in one direction thereof; hydraulically-actuated control means for transmitting a constant-pressure thrust to said carriage element in opposition to the movement imparted to said carriage element by said actuating means, said control means comprising a cylinder, a piston slidably retained within said cylinder, means supplying a hydraulic medium to said cylinder, one of said elements being connected to said cylinder, the other of said elements being connected to said piston, said cylinder and said piston extending on a common axis substantially parallel to the direction of movement of said carriage by said actuating means, an auxiliary carriage element slidably mounted for reciprocation in a path perpendicular with respect to the path of said first-mentioned carriage element, an auxiliary supporting element for said auxiliary carriage element carried by said first-mentioned carriage element, auxiliary actuating means for effectuating movement of said auxiliary carriage element, an auxiliary cylinder, an auxiliary piston slidably retained within said auxiliary cylinder, conduit means interconnecting said first-mentioned cylinder with said auxiliary cylinder, one of said auxiliary elements being connected to said auxiliary cylinder, the other of said auxiliary elements being connected to said auxiliary piston, said auxiliary cylinder and said auxiliary piston extending along a common axis substantially parallel to the direction of movement of said auxiliary carriage element whereby hydraulic medium when supplied under pressure from said first-mentioned cylinder to said auxiliary cylinder exerts on said auxiliary carriage element a constant-pressure thrust, in opposition to the thrust imparted to said auxiliary carriage element by said auxiliary actuating means.

Having thus described the invention, what is claimed as new and desired to be secured by Letters Patent, is:

1. In a machine tool having a carriage element, a supporting element therefor on which said carriage element is arranged to perform reciprocal movement, and actuating means for effectuating movement of said carriage element at least during movement in one direction thereof; hydraulically-actuated control means for transmitting a constant-pressure thrust to said carriage element in opposition to the movement imparted to said carriage element by said actuating means, said control means comprising a cylinder, a piston slidably retained within said cylinder, means supplying a hydraulic medium to said cylinder, one of said elements being connected to said cylinder, the other of said elements being connected to said piston, said cylinder and said piston extending on a common axis substantially parallel to the direction of movement of said carriage by said actuating means, an auxiliary carriage element slidably mounted for reciprocation in a path perpendicular with respect to the path of said first-mentioned carriage element, an auxiliary supporting element for said auxiliary carriage element carried by said first-mentioned carriage element, auxiliary actuating means for effectuating movement of said auxiliary carriage element, an auxiliary cylinder, an auxiliary piston slidably retained within said auxiliary cylinder, conduit means interconnecting said first-mentioned cylinder with said auxiliary cylinder, one of said auxiliary elements being connected to said auxiliary cylinder, the other of said auxiliary elements being connected to said auxiliary piston, said auxiliary cylinder and said auxiliary piston extending along a common axis substantially parallel to the direction of movement of said auxiliary carriage element whereby hydraulic medium when supplied under pressure from said first-mentioned cylinder to said auxiliary cylinder exerts on said auxiliary carriage element a constant-pressure thrust in opposition to the thrust imparted to said auxiliary carriage element by said auxiliary actuating means.

2. In a machine tool according to claim 1, wherein said first-mentioned piston and said auxiliary piston are each provided with an axial bore defining a path of flow for said hydraulic medium therethrough.

References Cited in the file of this patent

UNITED STATES PATENTS

| | | | |
|---|---|---|---|
| 1,865,528 | Lovely | | July 5, 1932 |
| 2,048,107 | Collins | | July 21, 1936 |
| 2,174,850 | Svenson | | Oct. 3, 1939 |
| 2,370,032 | Groen | | Feb. 20, 1945 |
| 2,422,682 | Johnson | | June 24, 1947 |
| 2,566,116 | Chang | | Aug. 28, 1951 |

FOREIGN PATENTS

| | | | |
|---|---|---|---|
| 384,986 | Great Britain | | Mar. 10, 1931 |
| 597,017 | Great Britain | | Jan. 15, 1948 |